Jan. 12, 1937. P. SCHUFTAN 2,067,349
PROCESS AND APPARATUS FOR SEPARATING GAS MIXTURES
Filed July 10, 1936
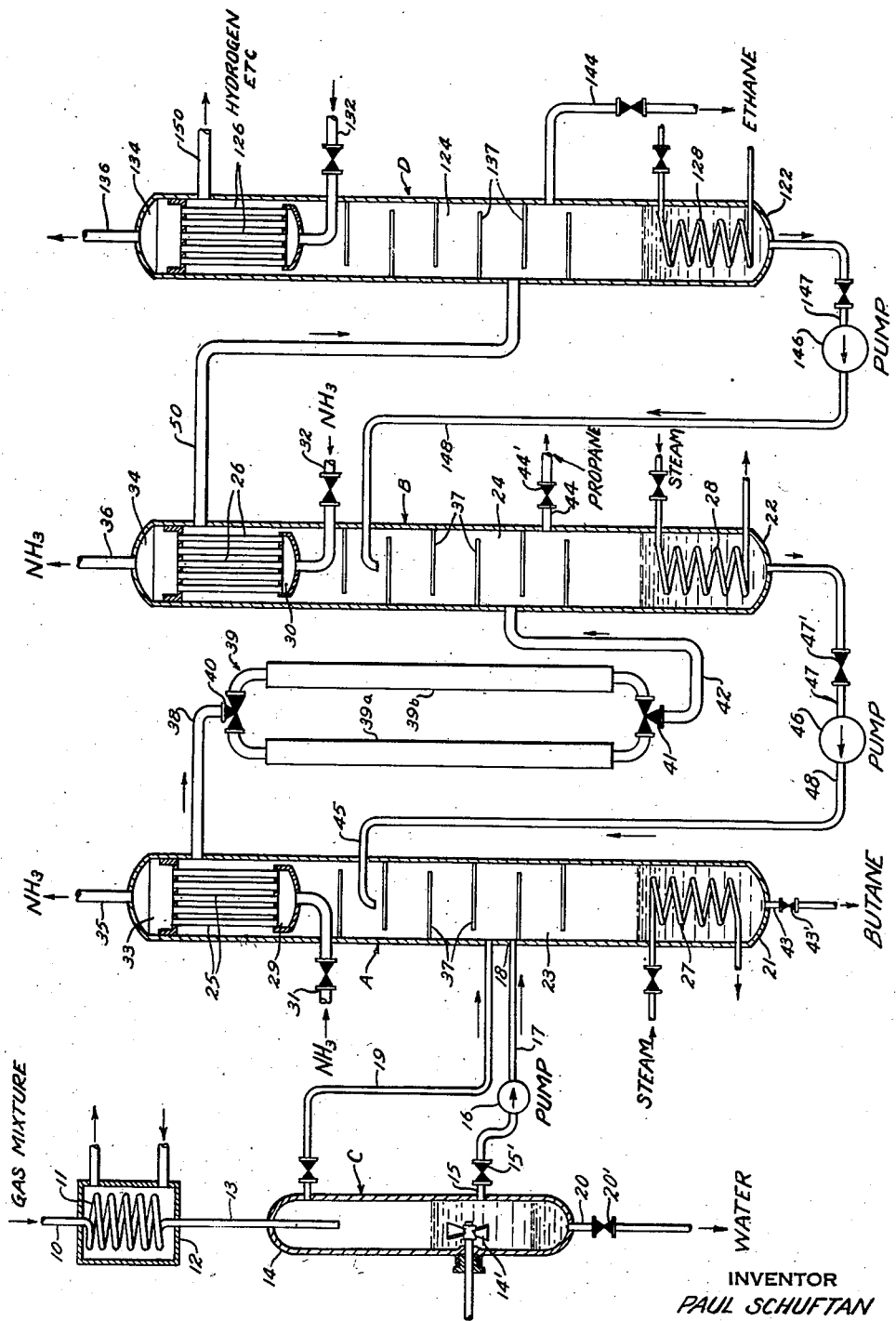
INVENTOR
PAUL SCHUFTAN
BY
ATTORNEY Patented Jan. 12, 1937

2,067,349

UNITED STATES PATENT OFFICE 2,067,349

PROCESS AND APPARATUS FOR SEPARATING GAS MIXTURES

Paul Schuftan, Hoellriegelskreuth, near Munich, Germany, assignor to The Linde Air Products Company, a corporation of Ohio Application July 10, 1936, Serial No. 89,882
In Germany May 21, 1935

15 Claims. (Cl. 62—175.5)

This invention relates to a process and apparatus for separating gas mixtures, and more particularly to the equalization of fluctuations in the temperature or composition of the mixture supplied to apparatus for the separation of gas mixtures by liquefaction and rectification.

When separating gas mixtures by treatment in successive rectification columns, for the separation of individual components or groups of components according to their boiling points, there exists an operating difficulty resulting from the close coupling of the several columns of such a nature that a disturbance in the balance of the first column will likewise throw the following columns out of equilibrium so that the readjustment of conditions to counteract the disturbance is extraordinarily difficult. If, for example, a change in temperature or composition of the raw gas should occur so that the reflux liquid formed at the condenser in the first rectification column does not suffice for retaining components having the highest boiling points, then the latter will pass over into the next rectification column and will contaminate the components separated therein.

The principal object of the present invention is to provide a process and apparatus for reducing disturbances of the normal operating conditions in successively connected rectification columns of a gas separation apparatus, by equalizing fluctuations of the temperature and composition of the gas mixture supplied to the first column. In accordance with the present invention, the gas mixture to be separated is cooled before entering the first rectification column to a constantly maintained temperature such that a condensation of the gas components of the mixture will be sure to occur under all possible conditions. The liquid resulting from such cooling is collected in a storage vessel of such volume as to substantially equalize the fluctuations in the quantity being formed. The collected liquefied mixture is thereupon introduced at a constant volumetric rate into the first rectification column at a suitable point.

The above and other objects of the invention and the novel features thereof will be apparent from the following description having reference to the accompanying drawing, which is a diagrammatic view of an exemplary apparatus embodying the principles of the present invention and which is adapted particularly for the separation of butane and propane from a mixture of hydrogen and other hydrocarbons.

Such hydrocarbons having more than four carbon atoms to the molecule that may be contained in the mixture are first removed therefrom by a prior treatment involving condensation or by washing with a solvent. The separation of the butane component is effected in a first rectification column shown generally at A, and the separation of the propane component occurs in a second similar column shown generally at B. Apparatus for equalizing variations of temperature and composition of the gas mixture supplied is indicated generally at C. The gas mixture which may, for example, be a mixture of propane, butane, hydrogen, ethane and lighter hydrocarbons and whose composition and temperature may vary from time to time is supplied by a conduit 10 to a cooling coil 11 where it is cooled to a uniformly maintained temperature by a cooling medium such as water passed through a jacket 12 surrounding coil 11. From coil 11 the cooled and substantially liquefied mixture is passed into a storage vessel 14 of such size as to hold a substantial supply of both liquid and gas. From a point below the normal liquid level in vessel 14 but at a substantial distance above the bottom, a conduit 15 controlled by valve 15' is provided conducting liquid to the inlet of a liquid pump 16 that may be regulated to deliver a constant output through the conduit 17 that conducts to a selected tray of column A substantially midway of its ends at point 18. Vessel 14 is also connected with column A by a conduit 19 connected at an upper portion of vessel 14 and to column A at point 18. A drain conduit 20 controlled by valve 20' is also provided for draining collected moisture from the lower part of vessel 14. Means for stirring the liquid hydrocarbons collected in vessel 14 to insure thorough mixing, may be provided such as, for example, a rotary impeller 14' in the liquid turned by a shaft passing through a wall of the vessel. Obviously the stirring device should be arranged to stir the hydrocarbon mixture only.

The columns A and B are substantially of customary construction and comprise cylindrical chambers 23 and 24 having liquid collecting portions 21 and 22, respectively, adjacent their lower ends and condensers 25 and 26 disposed therein adjacent their upper ends. The portions 21 and 22 have heating coils 27 and 28 disposed therein supplied with heating agents such as steam while a refrigerating medium such as ammonia is supplied to condensers 25 and 26. The ammonia is supplied to lower headers 29 and 30 through conduits 31 and 32 and passes from the upper headers 33 and 34 through conduits 35 and 36. Between the portions 21 and 22 and condensers 25 and 26 the columns are provided with rectifying trays 37 through which gas passes upward in intimate contact with the liquid passing down. From the uppermost portion of chamber 23 a conduit 38 conducts gas not condensed by the condenser 25 to the inlet of a gas drying device 39 which may, for example, as herein shown, comprise a pair of interchangeable drying traps 39a and 39b which contain a drying substance for the removal of water and are interchangeably connected at their upper ends by three-way valve 40 to conduit 38 and at their lower ends by three-way valve 41 to a conduit 42 that leads to an intermediate point of chamber 24.

Butane that collects in the portion 21 of column A is withdrawn therefrom by a conduit 43 controlled by valve 43'. Propane that collects on column B is withdrawn from a point in the column above the portion 22 by a conduit 44 which is controlled by a valve 44'. For ensuring that there shall be sufficient supply of reflux liquid in column A, means is provided for transferring a desired amount of liquid from a point adjacent the bottom of column B to a point in column A just below the condenser 25 at a point 45. The transfer is preferably effected by a pump 46 whose inlet is connected by a conduit 47 controlled by the valve 47' to the portion 22 of column B and whose outlet is connected by a conduit 48 to the point 45 of column A.

Another similar rectifying column, shown generally at D, may be provided for separating a third component such as ethane from the remaining components. Such a column receives gas from the column B through a conduit 50 which conducts a gaseous remainder from the upper portion of the column B after it has passed the condenser 26. The structure of column D is similar to that of column B and equivalent parts are designated by numbers which have the prefix 1 added to the number designating the corresponding part of column B. A cooling agent providing the desired low temperature is passed through the condenser 126 for producing a reflux liquid, and a heating agent may be passed through the coil 128. The ethane fraction is withdrawn through conduit 144 and if desired a portion of the liquid from the lower part 122 of column D may be passed by means of conduit 147, pump 146, and a conduit 148 to the column B for providing supplementary reflux in a manner similar to that provided for column A. The hydrogen together with other residue gases passes out of column D through conduit 150.

Should there be an increase in the temperature of the raw gas mixture supplied or in its butane content or a decrease in its propane content, it would be possible that a sufficient quantity of pure propane to serve for completely washing out the butane contained in the rising vapor would no longer be liquefied at the condenser 25. This butane would then pass over into column B with the result that the butane yield of column A is reduced. The propane separated in column B is then contaminated and the temperature of the boiling liquid at the foot of column B is increased, so that the latter is thrown out of equilibrium.

It may be thought that it is possible to compensate for the fluctuations of the temperature and the composition of the gas mixture by correspondingly altering the condenser temperatures. However, inasmuch as the condenser temperature or the volume of liquid condensed by the condenser must be adjusted to correspond with the heat supply at the foot of the column, such method of operation would involve extraordinarily difficult regulation of the columns. Furthermore, the possibility of reducing the condenser temperature is considerably limited due to the fact that the output of the refrigerating machine falls with a decrease in the evaporation temperature of the ammonia. Finally, the thermal inertia of the condensers and the refrigerating machine is generally too great to permit adjustment for compensating relatively brief fluctuations.

In accordance with the invention, therefore, the gas mixture is cooled in the coil 11 to a constantly maintained temperature which is adjusted according to the kind of gas mixture and the pressure thereof to such a value at which condensation will occur without fail with the most unfavorable proportions of the components to be encountered. The condensates precipitated in the coil 11 pass into and are held in the vessel 14, which should be so large that a temporarily increased quantity of condensates can be stored for a period sufficient to substantially equalize the fluctuations. These stored condensates are mixed by agitation of the inflowing material so that their composition, which depends on the state of the raw gas mixture is equalized and made substantially uniform. The condensed hydrocarbons of averaged composition are then introduced at a constant volume rate by operation of the liquid pump 16 into the rectification column A at a suitable point 18 through the conduit 17. The water contained in and condensed together with the hydrocarbons separates from the latter in the vessel 14 to collect in the lowermost portion thereof and is drained separately as desired through the conduit 20. Uncondensed gases and vapors above the liquid in vessel 14 pass through the conduit 19 into the column A.

As a result of the above treatment, the raw gas mixture enters the rectification column A at a constant temperature and with a substantially uniform composition. If, for example, there is an increase in the butane content of the gas mixture supply, it is true that a greater proportion of butane would condense in coil 11 and collect in vessel 14. However, the butane content of the vapors rising in column A above the point 18 would not be appreciably altered thereby. The increased volume of condensates resulting from the higher butane content of the gas mixture is stored in the vessel 14 mixed with the liquid already formed and which mixture is then introduced at a uniform rate into the column A, in the lower part of which it is freed from its propane content by heat supplied by the heating coil 27. The butane of desired purity gathers at the bottom portion 21 of the column A and is withdrawn in a liquid state through the conduit 43, while a butane-free gas mixture is withdrawn at the top of the column through the conduit 38. The temperature of the condenser 25 is adjusted by control of the refrigerant to the condensing temperature of the propane in the gas mixture existing at the top of the column.

The present method of operation makes it possible to automatically equalize especially the brief fluctuations in volume and temperature of the raw gas mixture and therefore the necessity of any further adjustment of the columns is limited to such instances when the mean value of the fluctuations should alter, which in general should very seldom occur.

Furthermore an appreciable portion of the water contained in the mixture is removed in vessel 14 prior to its introduction into the rectification column so that a special preliminary drying is unnecessary. A particular advantage results from the fact that the drying of the gases after leaving the column A can be accomplished in the interchangeable traps or dryers 39a and 39b.

Inasmuch as the moisture content of the gas is then low, and the components having the highest boiling points which readily cause disturbances are previously removed, these dryers may be relatively small.

The butane-free and dry gas after passage through dryers 39 is introduced into the column B through the conduit 42. Liquefied portions of the mixture are heated with steam passing through the coil 28 at the bottom 22 of column B, whose condenser 26 is cooled by ammonia flowing therethrough regulated to provide refrigeration at a desired temperature for condensing the component having the next lower boiling point below that of propane, namely, the ethane. The propane collects at the bottom portion 22 of the column B while the residual gas withdrawn at the top through conduit 50 contains, in addition to hydrogen, only hydrocarbons with two and one carbon atoms to the molecule.

In the event that a variation of the raw gas mixture of such a character occurs that the propane content decreases to such a degree that there is a danger of an insufficient liquefaction of propane occurring at condenser 25, the pump 46 is operated so that a portion of the liquid occurring in the portion 22 of column B can be returned at a controllable rate to the upper portion of the column A. By this means, the partial pressure of the propane in the upper part of the column A is increased, thus assuring the formation of a sufficient volume of reflux liquid. The condensing point temperature of the propane also rises with the increase in its partial pressure so that it becomes possible to operate with higher condensate temperatures and particularly to avoid having the temperature drop below 0° C. at the condenser so as to avoid the formation of ice deposits in the column A.

When thus increasing the partial pressure of propane in column A by returning liquid propane from the column B to column A, there is a further possibility of insuring against contamination of the propane with butane which might otherwise be caused by variations of the composition of the gas mixture. To this end, the propane product of desired purity is withdrawn from the column B at a point above several of the lowermost rectification trays, while the liquid withdrawn by the pump 46 from the sump portion 22 of the column B is introduced into column A at the point 45 below the uppermost rectification trays. On the lower trays of column B any butane which may possibly be carried over is washed out of the propane being withdrawn so that the latter is recovered in the desired state of purity under all conditions. As a result, the butane that is washed down collects in the liquid at the bottom portion 22 of column B and is returned by means of the pump 46 to column A where the separation of butane and propane will take place on its upper trays.

The principles of the described process may be utilized when separating various other gas mixtures. The butane then may represent the component having the highest boiling point, which under certain conditions may consist of a mixture of several components. The propane represents the component having the next lower boiling point. If it is desired to recover more than two components of a mixture, an additional rectification column is provided for the separation of each such component. If the components to be recovered in substantially pure form have a mean boiling point, the constituents having the higher boiling point are previously removed from the gas mixture.

What is claimed is:

1. A process for the equalization of fluctuations of the temperature or the composition of the gas mixture supplied to gas separating apparatus, which includes the steps of cooling the raw gas mixture to a constant temperature at which a condensation will occur under all conditions to be encountered; collecting and holding the condensates at the reduced temperature in a storage vessel for a substantial period to mix the portions condensed with portions previously liquefied; and introducing the collected condensate in the liquid state at a uniform rate into the separating apparatus.

2. Process for the equalization of fluctuations of the temperature or the composition of the gas mixture supplied to a plurality of gas separating and rectifying columns connected in series and adapted for the separation of said mixture into its components, which includes the step of returning a portion only of the components having the lower boiling point separated in a subsequent column in the liquid state to the upper portion of a preceding rectification column in the liquid state.

3. Process according to claim 2, including the steps of withdrawing the components produced by rectification in a subsequent column from a point intermediate the ends of said column; withdrawing the liquid to be returned from the lowest portion of said subsequent column; and introducing said liquid into the preceding column at a point intermediate its ends.

4. Process according to claim 1, including the steps of cooling the gas mixture to approximately 0° C.; separating therefrom the component having relatively the highest boiling point; drying the gas mixture after said separation; and subjecting said mixture to further rectification for the separation of additional components.

5. Process for separating gas mixtures which comprises cooling said mixture to a temperature constantly maintained at such a value that liquefaction of portions of the mixture occurs under all conditions to be encountered; collecting and mixing both liquid and gaseous portions of the cooled mixture with portions previously collected; withdrawing portions of said mixture from both the liquid and gaseous state of the collected and mixed portions; effecting the withdrawal of said liquid portion at a constant rate; and rectifying the portions withdrawn under substantially uniformly maintained conditions of temperature and flow to separate components of desired purity.

6. Process for separating gas mixtures which comprises cooling said mixture to a constantly maintained temperature; collecting and mixing said cooled mixture with portions thereof previously cooled and collected; subjecting said mixture to a first stage rectification under substantially uniformly maintained conditions to separate a component of relatively high boiling point; subjecting the remainder of said mixture to a second stage rectification to separate another component of desired purity; and returning a liquid product of said second stage rectification at a desired rate to assist said first stage rectification.

7. Process for separating gas mixtures which comprises cooling said mixture to a constantly maintained temperature; collecting and mixing said cooled mixtures with portions thereof previously cooled and collected; subjecting said mixture to a first stage rectification under substantially uniformly maintained conditions to separate a component of relatively high boiling point; subjecting the remainder of said mixture to a second stage rectification to separate another component of desired purity; and returning a liquid product of said second stage rectification at a desired rate to assist said first stage rectification sufficient to compensate for variations tending to change said conditions.

8. Process for separating gas mixtures which comprises cooling said mixture to a constantly maintained temperature; collecting and mixing said cooled mixture with portions thereof previously cooled and collected; subjecting said mixture to a first stage rectification under substantially uniformly maintained conditions to separate a component of relatively high boiling point; subjecting the remainder of said mixture to a second stage rectification to separate another component of desired purity; returning a liquid product of said second stage rectification at a desired rate to assist said first stage rectification sufficient to compensate for variations tending to change said conditions; separating entrained moisture from the mixture supplied prior to said first stage rectification; and removing moisture from said remainder of the mixture prior the said second stage rectification.

9. Process for separating gas mixtures which comprises cooling said mixture to a constantly maintained temperature; collecting and mixing said cooled mixture with portions thereof previously cooled and collected; separating entrained moisture from the mixed portions collected; cooling said mixture to a constantly maintained temperature; collecting and mixing said cooled mixture with portions thereof previously cooled and collected; subjecting said mixture to a first stage rectification under substantially uniformly maintained conditions to separate a component of relatively high boiling point; subjecting the remainder of said mixture to a second stage rectification to separate another component of desired purity; returning a liquid product of said second stage rectification at a desired rate to assist said first stage rectification sufficient to compensate for variations tending to change said conditions; and removing moisture from said remainder of the mixture during its passage between stages.

10. Process for separating gas mixtures which comprises subjecting said mixture to successive stages of rectification involving countercurrent contact of liquid and gas phases of said mixture under substantially constantly maintained conditions of temperature and flow for separating components in a desired state of purity having successively lower normal boiling points; controlling changes of the temperature of the gas material supplied by reducing the temperature thereof to a uniformly maintained value; reducing the effects of changes in the composition of the gas mixture supplied by temporarily storing and mixing successive portions of the cooled mixture; delivering said mixture to said stages at a substantially constant rate; and compensating for those variations in the composition which are of such magnitude as to affect said first stage by passing controlled amounts of a liquid product of said second stage to supplement liquid flowing in said first stage.

11. Apparatus for separating gas mixtures which comprises means for supplying the gas mixture to be separated under a uniform pressure but varying temperature and composition; means for reducing the temperature of said mixture to a uniformly maintained value; means for collecting and holding said cooled mixture at the reduced temperature for a period sufficient to equalize the effect of fluctuations of the composition of said mixture on the separation; rectification apparatus for continuously separating components of said mixture of desired purity; and means for introducing said cooled and equalized mixture to the rectification apparatus at a substantially uniform rate.

12. Apparatus for separating gas mixtures which comprises means for supplying the gas mixture to be separated under a uniform pressure but varying temperature and composition; means for reducing the temperature of said mixture to a uniformly maintained value; means for substantially equalizing the effect of fluctuations of the composition of said mixture; a first rectifying column for separating a component having a high boiling point; means for introducing said cooled and equalized mixture to said first column at a substantially uniform rate; a second rectification column receiving gas material from said first column and adapted to separate a component having a lower boiling point; and means for transferring desired amounts of liquid from said second column to said first column.

13. Apparatus for separating gas mixtures which comprises the combination of rectifying columns connected to operate in series for separating a constituent of the mixture having a relatively high boiling point in a first column of the series and constituents of successively lower boiling points in respective successively connected subsequent columns of the series; and means for withdrawing liquid at a desired rate from the lower portion of a subsequent column and supplying the same to a previous column at an upper portion thereof.

14. Apparatus for separating gas mixtures which comprises the combination of rectifying columns connected to operate in series for separating a constituent of the mixture having a relatively high boiling point in a first column of the series and constituents of successively lower boiling points in respective successively connected subsequent columns of the series; means for withdrawing liquid at a desired rate from the lower portion of a subsequent column and supplying the same to a previous column at an upper portion thereof; means for introducing the mixture to be separated in a cooled state into said first column; means for passing a gaseous remainder of the first rectification into a second column of the series; means for separating entrained moisture from said mixture being introduced into said first column; means for cooling the upper portion of said first column to a temperature maintained above the freezing point of said moisture; and means for removing moisture from said remainder while passing from said first to said second column.

15. Apparatus for separating gas mixtures which comprises the combination of rectifying columns connected to operate in series for separating a constituent of the mixture having a relatively high boiling point in a first column of the series and constituents of successively lower boiling points in respective successively connected subsequent columns of the series; means for introducing the mixture to be separated in a cooled state into said first column; means for passing a gaseous remainder of the first rectification into a second column of the series; means for separating entrained moisture from said mixture being introduced into said first column; means for cooling the upper portion of said first column to a temperature maintained above the freezing point of said moisture; means for removing moisture from said remainder while passing from said first to said second column; and means for withdrawing liquid at a desired rate from the lower portion of a subsequent column and supplying the same to a previous column at an upper portion thereof.

PAUL SCHUFTAN.